Oct. 16, 1923.
A. J. GREAVES
1,471,122
DEVICE FOR FACILITATING THE CARVING OF MEAT, POULTRY, AND THE LIKE
Filed May 18, 1922    2 Sheets-Sheet 1
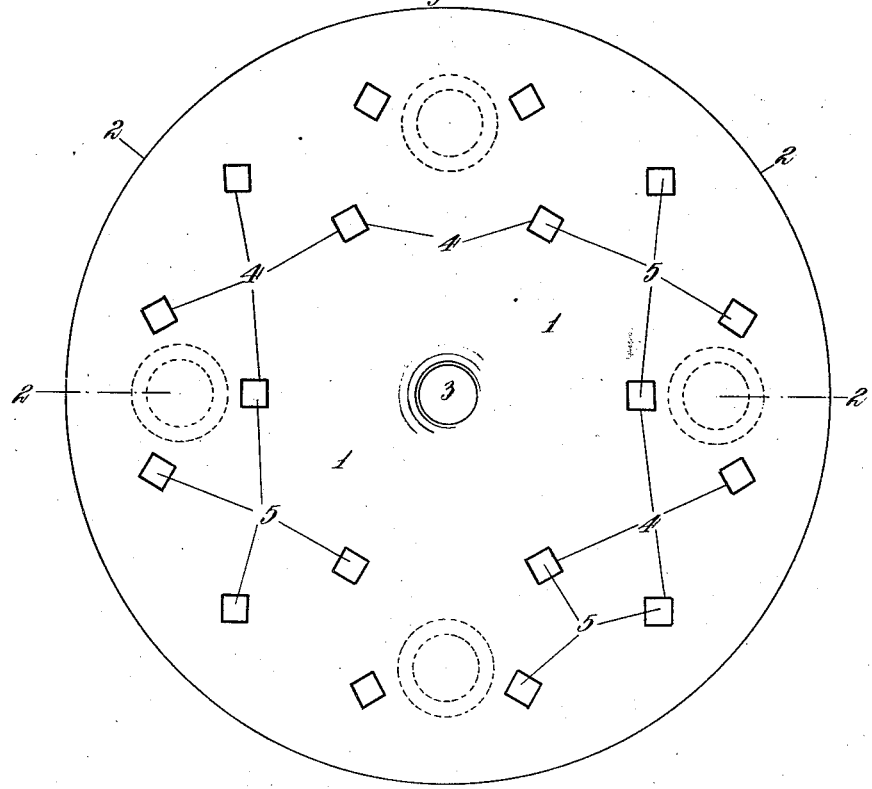
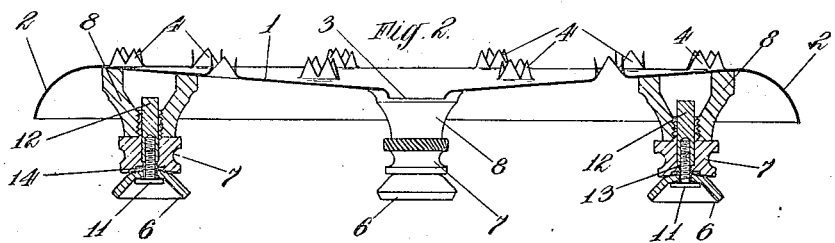
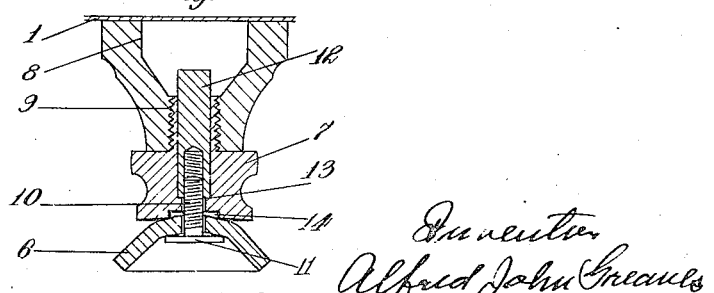

Oct. 16, 1923.    A. J. GREAVES    1,471,122
DEVICE FOR FACILITATING THE CARVING OF MEAT, POULTRY, AND THE LIKE
Filed May 18, 1922    2 Sheets-Sheet 2
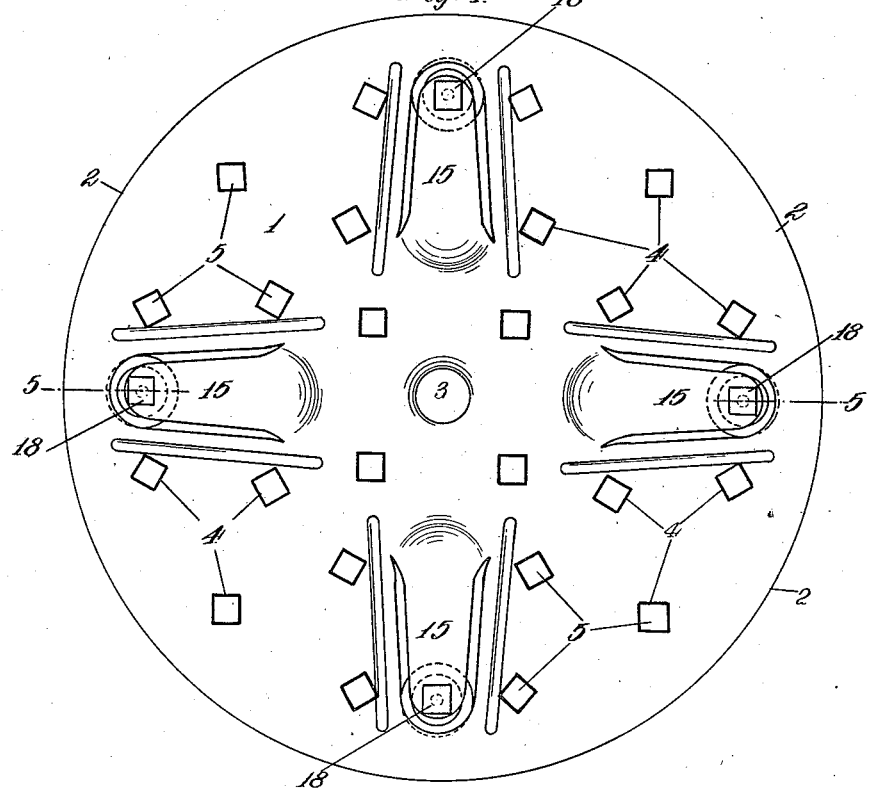
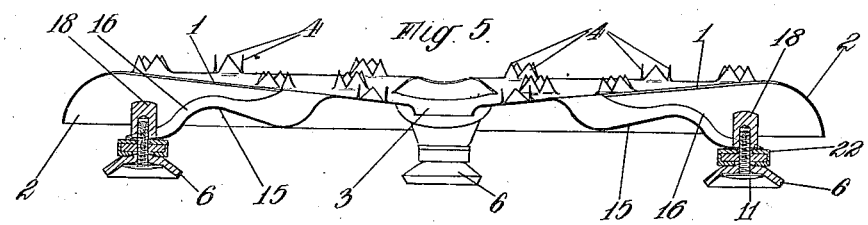
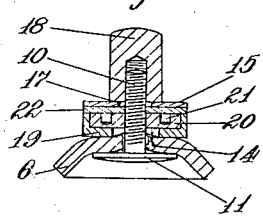

Patented Oct. 16, 1923.

1,471,122

UNITED STATES PATENT OFFICE.

ALFRED JOHN GREAVES, OF PECKHAM, LONDON, ENGLAND.

DEVICE FOR FACILITATING THE CARVING OF MEAT, POULTRY, AND THE LIKE.

Application filed May 18, 1922. Serial No. 561,894.

*To all whom it may concern:*

Be it known that I, ALFRED JOHN GREAVES, a subject of the King of Great Britain, residing at 11 Rye Hill Park, Peckham, in the county of London, England, have invented certain new and useful Improvements in Devices for Facilitating the Carving of Meat, Poultry, and the like, of which the following is a specification.

This invention relates to a device for facilitating the carving of meat, poultry and the like. It is found that when a joint of meat is placed directly into the carving dish it is sometimes difficult to carve the same owing to the fact that the rim of the dish interferes with the use of the knife at the suitable angle, this being particularly the case when several portions have already been cut from the joint so that the latter is on a level with or below the rim of the dish. To meet this difficulty in accordance with the invention, I provide a non-slipping stand, platform or support adapted to be placed in the dish and to support the meat or the like above the level of the rim thereof. The stand comprises a top and three or more supports or legs which are provided at their feet with suction devices or cups, preferably made of india rubber for preventing the stand slipping relatively to the dish. The top of the stand is preferably made slightly concave and the surface thereof may be provided with upwardly extending projections, prongs or tangs adapted to penetrate slightly into the meat to hold the same from moving on the stand, or the top of the stand may be grooved, serrated or otherwise formed so as to provide a non-slipping surface. The stand may be provided with a depending peripheral flange which may be given an ornamental pattern if desired.

In order that the invention may be clearly understood and readily carried into effect the same is hereinafter described more fully with reference to the accompanying drawings in which:—

Figure 1 is a plan view and Figure 2 a sectional elevation taken on the line 2—2 of Figure 1, illustrating by way of example one constructional form of the device, and Figure 3 is a sectional elevation of a detail to an enlarged scale.

Figures 4, 5 and 6 respectively are similar views to Figures 1, 2 and 3, Figure 5 being a section on the line 5—5 of Figure 4, illustrating by way of example another constructional form of the device.

In the device shown in Figures 1 and 2 the concave top 1 is formed with a depending peripheral flange 2, a flanged central aperture 3 and upwardly projecting tangs 4, the latter of which are preferably formed by making cross cuts in a number of parts of the top and pressing upwardly the parts so cut. In thus forming the tangs, the top is also simultaneously provided with a number of apertures 5 adapted for the passage of any liquid or gravy passing from the meat. The top, as shown, is particularly, adapted to be stamped up or shaped from one piece of material. The suction cups are designated 6 and as shown in Figure 3, are secured to the undersurface of the top 1 by hollow thimble pieces 7 in screw threaded engagement with and thereby detachably attached to blocks 8 fixed to the said under surface and provided with threaded apertures for receiving screwed extensions 9 on the thimble pieces 7. Each of the suction cups 6, is detachably attached to one of the thimble pieces 7 by a screw threaded pin 10 provided with a head 11, and held in place in its respective thimble piece 7 by an internally screw threaded sleeve 12 which engages with an annular shoulder 13 on the inner surface of the thimble to which it is fitted. A space 14 is provided between the inner surface of the hollow thimble piece 7 and the screw threaded pin 10 and into such space is forced the centre portion of the india rubber disc (of which each suction cup is made) when the sleeve 12 is in position on the pin 10 by the head on the latter, and in being so forced into the said space, the disc of india rubber is formed into a suction cup. Each thimble piece 7 is provided with a milled edge to facilitate its removal from its block 8 for fitting it with a new suction cup and for cleansing purposes.

In the constructional form of device shown in Figures 4 and 5, the top 1 embodies the depending peripheral flange 2, central aperture 3 and struck up tangs 4 as in the previous construction described, and is also formed with integral depending arms 15 cut from the top and bent downwardly and fitted at the outer ends thereof with suction cups 6. Each of the arms 15 is provided with a flange 16 on each side to stiffen it and with an aperture 17 at its end for the passage of the screw threaded pin 10 which is fitted with a nut 18, for detachably securing a suction cup to its arm, as shown in Figure 6. The suction cup 6 is formed from a disc of india rubber in a similar manner to that previously described, the centre portion thereof being forced into a space 14 between the edges of a central aperture in a cup fitting 19 and the pin 10 by the head 11 thereon when secured in position by a nut 20 engaging the pin 10 which is held in its proper position relatively to the cup fitting 19 by the side thereof engaging the nut 20. For manipulating the nut 20 tommy holes 21 are provided therein. An india rubber washer 22 may be arranged between the arm 15 and the cup fitting 19 and nut 20.

When made of metal, the top may be coated with enamel, electroplated or otherwise treated.

What I claim and desire to secure by Letters Patent of the United States is:—

1. A device for facilitating the carving of meat, poultry or other articles of food on a dish or the like comprising a platform, members detachably attached to the under side thereof, and suction devices detachably attached to the lower ends of the members for gripping the dish.

2. A device for facilitating the carving of meat, poultry or other articles of food on a dish or the like, comprising a platform, members detachably attached thereto, and suction devices for gripping the dish detachably attached to the lower ends of the members, each device embodying a disc of india rubber attached to a fitting provided with a space therein and means for forcing the center of the disc into the space and shaping the dish into a suction cup.

ALFRED JOHN GREAVES.